United States Patent
Yi (10) Patent No.: US 11,202,507 B1
(45) Date of Patent: Dec. 21, 2021

(54) CONNECTING ASSEMBLY FOR SOFA AND SOFA

(71) Applicant: Leping Yi, Shenzhen (CN)

(72) Inventor: Leping Yi, Shenzhen (CN)

( * ) Notice: Subject to any disclaimer, the term of this patent is extended or adjusted under 35 U.S.C. 154(b) by 0 days.

(21) Appl. No.: 16/995,848

(22) Filed: Aug. 18, 2020

(51) Int. Cl.
| | |
|---|---|
| A47C 1/124 | (2006.01) |
| A47C 4/02 | (2006.01) |
| A47C 13/00 | (2006.01) |
| F16B 12/40 | (2006.01) |
| A47C 17/02 | (2006.01) |

(52) U.S. Cl.
CPC .............. *A47C 4/021* (2013.01); *A47C 1/124* (2013.01); *A47C 4/02* (2013.01); *A47C 4/028* (2013.01); *A47C 13/005* (2013.01); *A47C 17/02* (2013.01); *F16B 12/40* (2013.01); *F16B 2012/403* (2013.01)

(58) Field of Classification Search
CPC .... F16B 12/40; F16B 2012/403; A47C 1/124; A47C 4/02; A47C 4/021; A47C 4/028; A47C 13/005; A47C 17/02
USPC ................. 297/248, 440.1, 440.14
See application file for complete search history.

(56) References Cited

U.S. PATENT DOCUMENTS

| | | | | |
|---|---|---|---|---|
| 942,085 | A * | 12/1909 | Linder ................... | A47C 1/124 297/248 |
| 5,520,437 | A * | 5/1996 | LaPointe .............. | A47C 13/005 297/248 X |
| 5,544,938 | A * | 8/1996 | Saul ..................... | A47C 13/005 297/248 |
| 6,543,845 | B2 * | 4/2003 | Seitz ..................... | A47C 1/124 297/248 X |
| 7,252,273 | B2 * | 8/2007 | Lewellen ................ | A47C 4/02 248/222.14 |
| 10,519,997 | B2 * | 12/2019 | Stauss .................... | F16B 12/26 |
| 2005/0179303 | A1 * | 8/2005 | Owens .................... | A47C 4/02 297/440.1 |

* cited by examiner

*Primary Examiner* — Rodney B White (57) ABSTRACT

A connecting assembly for a sofa includes a first connecting piece fixing on a first component of the sofa, a second connecting piece fixing on a second component of the sofa, and a third connecting piece. The first connecting piece includes a first inserting portion. The second connecting piece includes a second inserting portion. A first end of the third connecting piece is inserting into and connecting with the first inserting portion. A second end of the third connecting piece is inserting into and connecting with the second inserting portion. When the third connecting piece is gradually inserting into the first inserting portion and the second inserting portion, contact pressures between at least portions of the third connecting piece, the first inserting portion and the second inserting portion gradually increases to make the third connecting piece clamping to the first inserting portion and the second inserting portion.

14 Claims, 7 Drawing Sheets

CONNECTING ASSEMBLY FOR SOFA AND SOFA

TECHNICAL FIELD

The present disclosure relates to a field of sofa technology, and in particular to a connecting assembly for a sofa and the sofa.

BACKGROUND

There are many types of sofas, including one-piece non-detachable sofas and detachable sofas. The one-piece non-detachable sofa is mainly fixed together by structural parts such as screws or rivets. Non-professionals cannot disassemble and assemble the one-piece non-detachable sofa by themselves, which is inconvenient. A detachable sofa is much more convenient, but a detachable sofa has a problem that the detachable sofa cannot being firmly installed. For example, Chinese patent application No. CN201683465U discloses a new type of detachable sofa. In the disclosure, disassembly and assembly of backrest and base is realized by inserting bolt screws into bolt holes provided with bolt sleeves. However, the bolt screws and the bolt sleeves are easy to loosen, resulting in unstable assembly of the detachable sofa.

SUMMARY

In view of foregoing in order to solve one of the technical problems in the prior art, it is necessary to provide a connection assembly for a sofa to make the installation of the sofa firmer.

The present disclosure provides a connecting assembly for a sofa. The connecting assembly for the sofa comprises:
a first connecting piece configured to fix on a first component of the sofa, and the first connecting piece comprises a first inserting portion;
a second connecting piece configured to fix on the second component of the sofa, and the second connecting piece comprises a second inserting portion; and
a third connecting piece.

A first end of the third connecting piece is inserting into and connecting with the first inserting portion. A second end of the third connecting piece is inserting into and connecting with the second inserting portion.

When the third connecting piece is gradually inserting into the first inserting portion, a contact pressure between at least portions of the third connecting piece and the first inserting portion gradually increases to make the third connecting piece clamping to the first inserting portion, and when the third connecting piece is gradually inserting into the second inserting portion, a contact pressure between at least portions of the third connecting piece and the second inserting portion gradually increases to make the third connecting piece clamping to the second inserting portion. The third connecting piece is connected with the first inserting portion and the second inserting portion such that the first component is connected together with the second component.

The first connecting piece is fixed on the first component of the sofa in advance, and the second connecting piece is fixed on the second component of the sofa. When transporting or storing, the first component and the second component are separated from each other. When in assembling, a user is able to insert and connect the first end of the third connecting piece with the first inserting portion, and insert and connect the second end of the third connecting piece with the second inserting portion. When the third connecting piece and the first connecting piece are being inserted into each other, and the third connecting piece and the second connecting piece are being inserted into each other, the contact pressure between at least portions of the third connecting piece and the first inserting portion gradually increases, thereby gradually clamping and fixing the third connecting piece to the first connecting piece and the contact pressure between at least portions of the third connecting piece and the second inserting portion gradually increases, thereby gradually clamping and fixing the third connecting piece to the second connecting piece, so that the first component is connected together with the second component.

The present disclosure provides a connecting assembly for a sofa. The connecting assembly for the sofa comprises
a first connecting piece configured to fix on a first component of the sofa, and the first connecting piece comprises a first inserting portion; and
a second connecting piece.

A first end of the second connecting piece is inserting into and connecting with the first inserting portion. A second end of the second connecting piece is configured to fix on a second component of the sofa.

When the second connecting piece is gradually inserting into the first inserting portion, a contact pressure between at least portions of the second connecting piece and the first inserting portion gradually increases to make the second connecting piece clamping to the first inserting portion, such that the first component is connected with the second component.

The first connecting piece is fixed on the first component of the sofa in advance, and the second connecting piece is fixed on the second component of the sofa. When transporting or storing, the first component and the second component are separated from each other. When assembling, the user is able to insert and connect the first end of the second connecting piece with the first inserting portion, When the second connecting piece and the first connecting piece are being inserted into each other, the contact pressure between at least portions of the second connecting piece and the first inserting portion gradually increases, thereby gradually clamping and fixing the second connecting piece to the first connecting piece, so that the first component is connected together with the second component.

BRIEF DESCRIPTION OF DRAWINGS

In the drawings, the same or functionally same elements are denoted by the same reference numbers.

DETAILED DESCRIPTION

Technical solutions in the embodiments of the present disclosure will be clearly and completely described below in conjunction with accompanying drawings in the embodiments of the present disclosure. Obviously, the described embodiments are only a part of the embodiments of the present disclosure, rather than all of the embodiments. Based on the embodiments of the present disclosure, all other embodiments obtained by those of ordinary skill in the art without creative work shall fall within the protection scope of the present disclosure. It can be understood that the drawings are only provided for reference and illustration, and are not used to limit the present disclosure. The connection relationship shown in the drawings is only for the convenience of clear description, and does not limit the connection mode.

Figure 1:
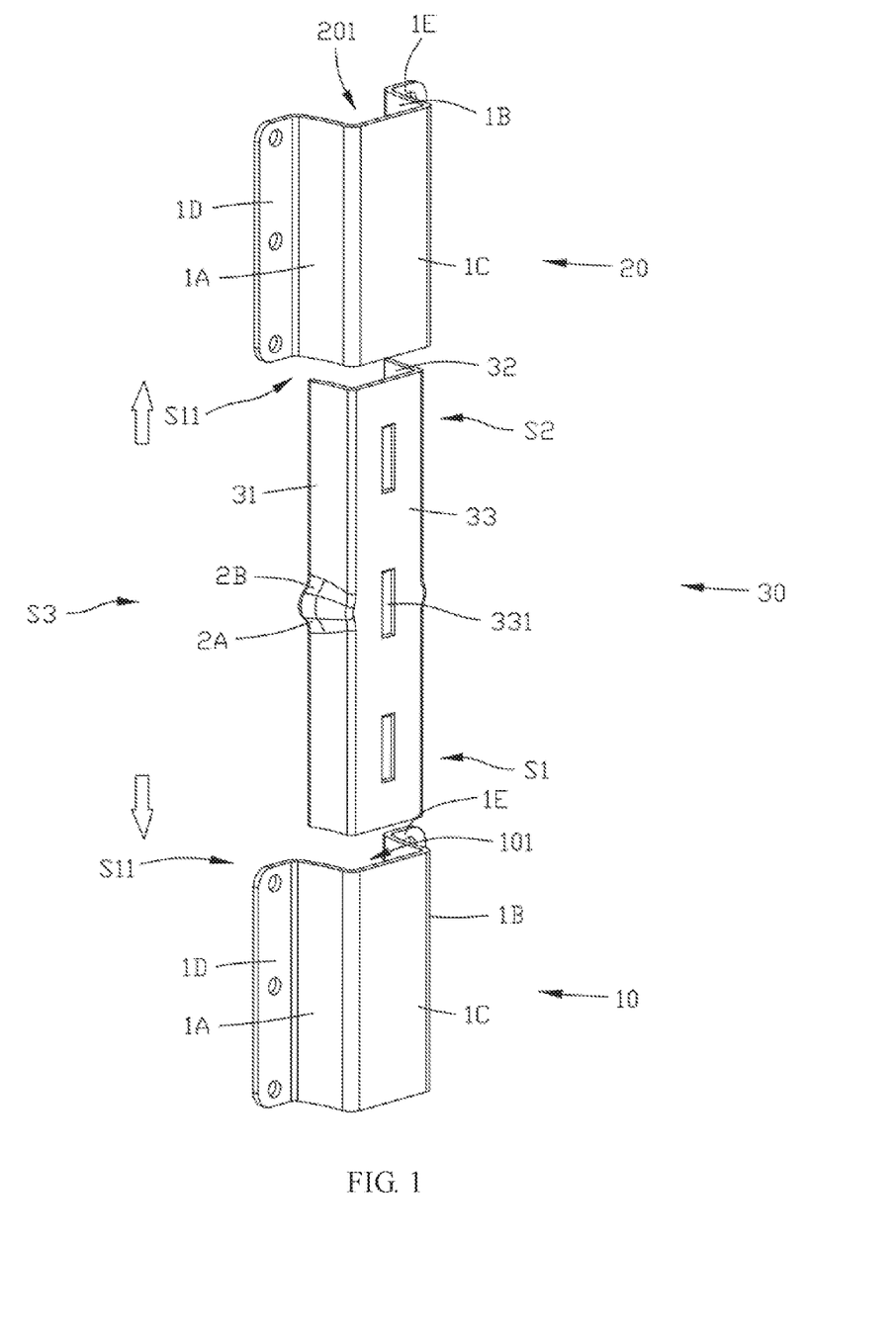
FIG. 1 is a schematic diagram showing a structure of a connecting assembly for a sofa from a first direction according to one embodiment of the present disclosure.
Figure 2:
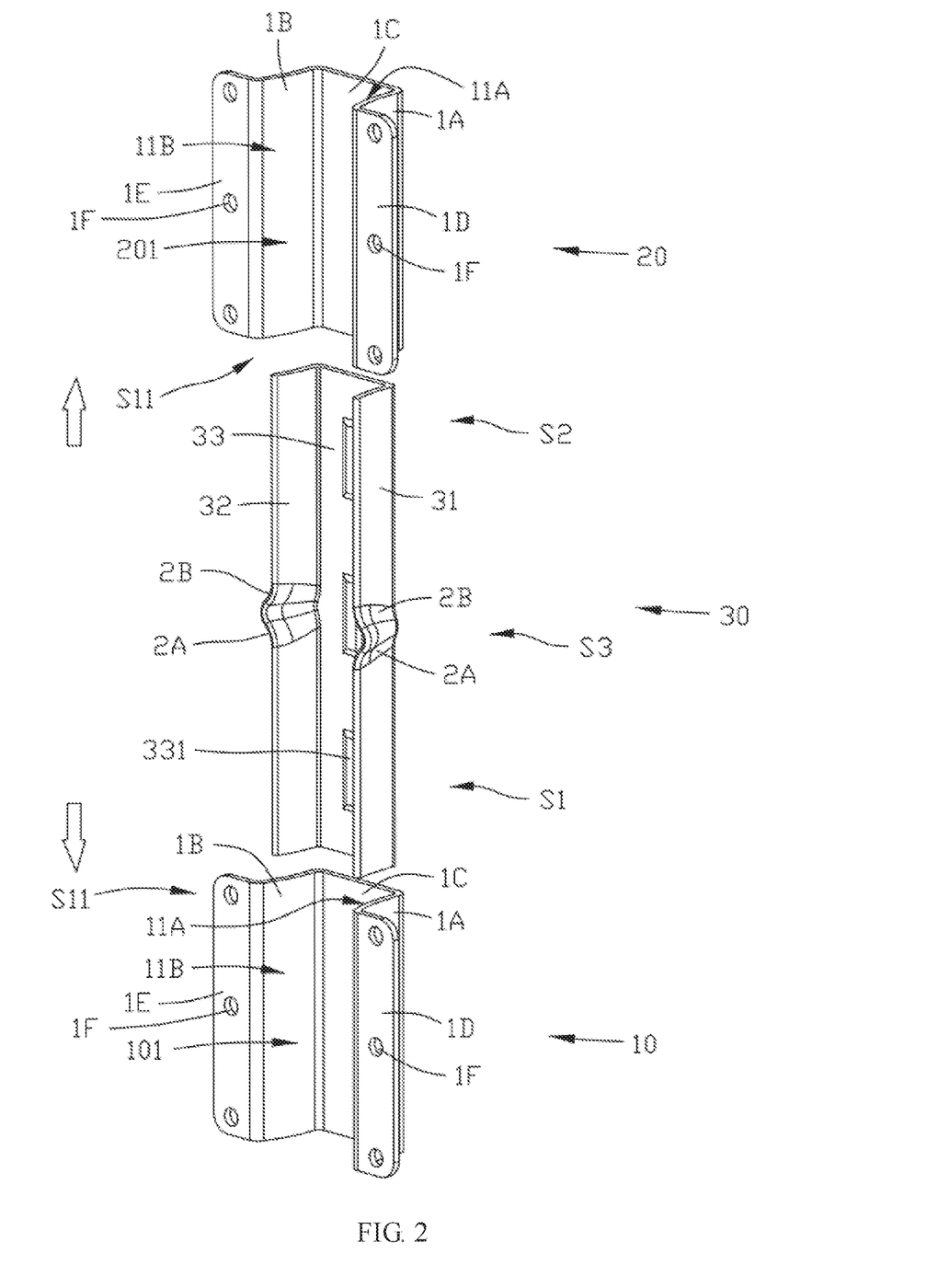
FIG. 2 is a schematic diagram showing a structure of the connecting assembly for the sofa from a second direction according to one embodiment of the present disclosure.
Figure 3:
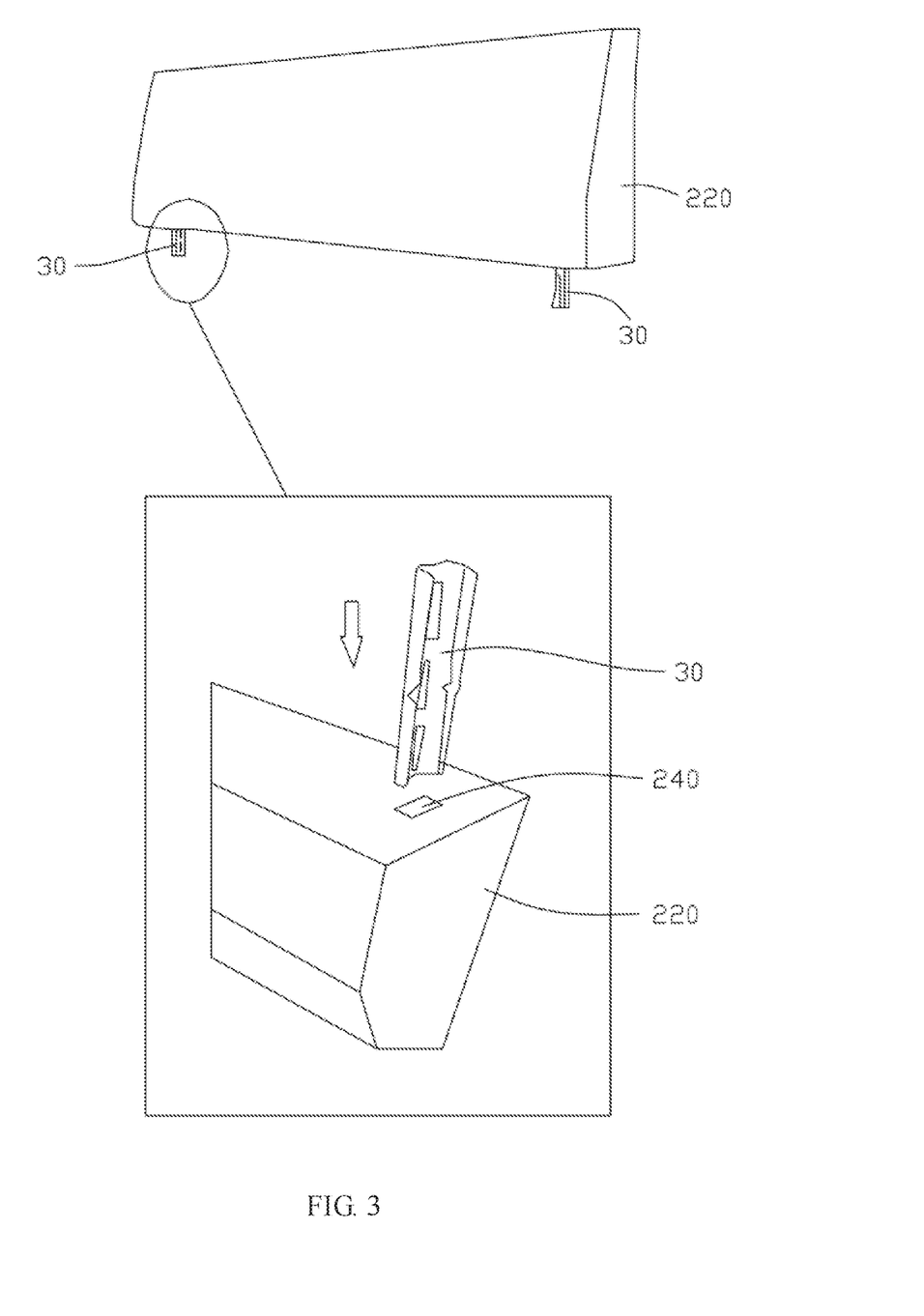
FIG. 3 is a schematic diagram showing how a third connecting piece of FIG. 1 is mounted on a second component.
Figure 4:
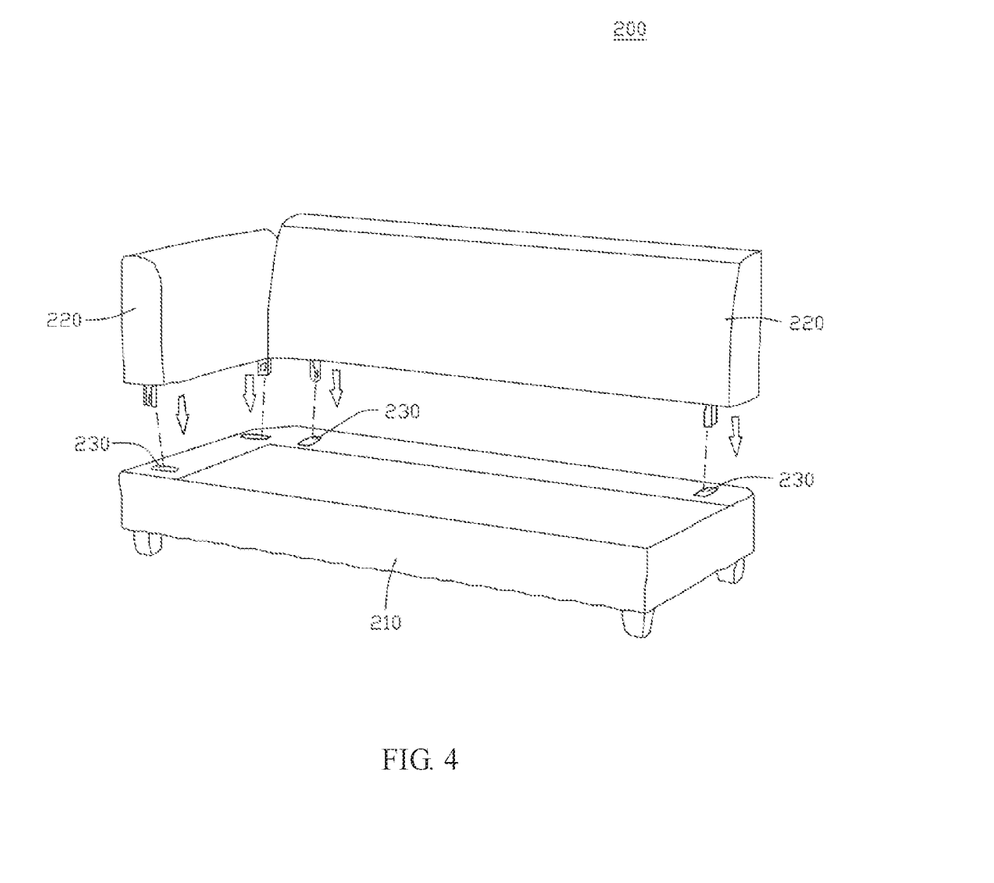
FIG. 4 is a schematic diagram showing how the second component where the third connecting piece of FIG. 1 is mounted on is mounted on a first component.

FIGS. 1 and 2 show a structure of a connecting assembly for a sofa 200 according to one embodiment of the present disclosure, and FIGS. 3 and 4 show the installation schematic diagrams of the connecting assembly according to one embodiment of the present disclosure. In the embodiment, the connecting assembly comprises a first connecting piece 10, a second connecting piece 20, and a third connecting piece 30. The first connecting piece 10 is configured to fix on a first component 210 of the sofa 200. The second connecting piece 20 is configured to fix on a second component 220 of the sofa 200. The third connecting piece 30 is connected with the first connecting piece 10 and the second connecting piece 20 to connect the first component 210 together with the second component 220, such that the first component 210 and the second component 220 are connected as a whole.

In one embodiment, the first component 210 and the second component 220 are provided with mounting grooves 230 and 240 for installing the first connecting piece 10 and the second connecting piece 20. The first connecting piece 10 and the second connecting piece 20 are hiddenly installed in the mounting grooves 230 and 240 in advance.

The first component 210 and the second component 220 belong to different parts of the complete sofa 200, and the first component 210 and the second component 220 need to be connected to each other to be assembled together to form a part of the sofa 200 or a complete sofa 200. For example, when the first component 210 and the second component 220 are assembled together, the first component is arranged below the second component 220. in one embodiment, the first component 210 is a sofa seat, and the second component 220 is a backrest or an armrest.

As shown in FIGS. 1 and 2, the first connecting piece 10, the second connecting piece 20, and the third connecting piece 30 are of a strip-shaped structure, The first connecting piece 10 and the second connecting piece 20 comprise a respective inserting end S11. The third connecting piece comprises a first end S1 and a second end S2. The first connecting piece 10 comprises a first inserting portion 101. The second connecting piece 20 comprises a second inserting portion 201. The first inserting portion 101 and the second inserting portion 201 are inserting grooves, and the third connecting piece 30 is an inserting plate. The first end S1 of the third connecting piece 30 is inserting into the first inserting portion 101 from the inserting end S11 of the first connecting piece 10. The second end S2 of the third connecting piece 30 is inserting into the second inserting portion 201 from the inserting end S11 of second connecting piece 20.

In the embodiment, structures of the first connecting piece 10 and the second connecting piece 20 are basically the same, which is convenient for batch molding, and is easy for users to install them by themselves correctly.

The first connecting piece 10 and the second connecting piece 20 are U-shaped pieces. Each U-shaped piece comprises a first wall 1A, a second wall 1B, a bottom wall 1C connecting the first wall 1A and the second wall 1B. The first wall 1A and the second wall 1B are arranged opposite to each other, so that space between the U-shaped pieces form inserting grooves 101 and 201. The first wall 1A comprises a first inner side surface 11A, and the second wall 1B comprises a second inner side surface 111B. The first wall 1A extends toward a side away from the second wall 1B to form a first mounting portion 1D. The second wall 1B extends toward a side away from the first wall 1A to form a second mounting portion 1E. The first mounting portion 1D and the second mounting portion 1E comprise screw holes 1F for screws to pass through and tighten them on the first component 210 or the second component 220, thereby fixing the first connecting piece 10 on the first component 210 and fixing the second connecting piece 20 on the second component 220.

The third connecting piece 30 is a U-shaped inserting plate, and a structure of the U-shaped inserting plate is similar to the U-shaped pieces. The U-shaped inserting plate 30 comprises a first side wall 31, a second side wall 32, a bottom wall 33 connecting the first side wall 31 and the second side wall 32. Reinforcing ribs 331 are formed on the bottom wall 33 of the U-shaped inserting plate 30 to improve deformation resistance of the bottom wall 33. The first side wall 31 and the second side wall 32 comprise a respective first outer contact surface 2A close to the first end S1 of the U-shaped inserting plate 30 and a second outer contact surface 2B close to the second end S2 of the U-shaped inserting plate 30. The first outer contact surface 2A gradually expands outward toward the second end S2 of the U-shaped inserting plate 30. The second outer contact surface 2B gradually expands outward toward the first end S1 of the U-shaped inserting plate 30. The first outer contact surface 2A and the second outer contact surface 2B may be flat or curved surfaces inclined outward. When assembling, the first outer contact surface 2A is in contact with an inner surface of the inserting groove 101 of the first connecting piece 10, and the second outer contact surface 2B is in contact with an inner surface of the inserting groove 201 of the second connecting piece 20. It can be understood that in one embodiment, only one of the first side wall 31 and the second side wall 32 comprises the first outer contact surface 2A and the second outer contact surface 2B.

The first outer contact surface 2A and the second outer contact surface 2B are close to a middle section S3 of the third connecting piece 30. The middle section S3 is arranged between the first end S1 and the second end S2. In one embodiment, the first outer contact surface 2A and the second outer contact surface 2B are symmetrical arranged respect to the center thereof.

Because the first outer contact surface 2A and the second outer contact surface 2B gradually expands outward, at positions of the first outer contact surface 2A and the second outer contact surface 2B, a distance between an outer surface of the first side wall 31 and an outer surface of the second side wall 32 gradually increases. During the third connecting piece 30 is inserting into the inserting grooves 101 and 201 for a certain distance, a contact pressure between the first outer contact surface 2A, the second outer contact surface 2B and the inserting grooves 101 and 201 gradually increases, and when the contact pressure reaches a certain level, the third connecting piece 30 is unable to process with the operation of inserting into the inserting grooves 101 and 201. Both ends of the third connecting piece 30 are clamped in the inserting grooves 101 and 201, so that the first connecting piece 10 and the second connecting piece 20 are fixed together by the third connecting piece 30.

During the insertion process, the first side wall 31 and the second side wall 32 of the U-shaped inserting plate 30 will be squeezed to produce a certain amount of deformation inward, and the U-shaped inserting plate 30 is able to be inserted into the inserting grooves 101 and 201 with less effort. The first side wall 31 and the second side wall 32 are clamped in the inserting grooves 101 and 201 in a deformable manner, and the connection between the third connecting piece 30, the first connecting piece 10, and the second connecting piece 20 is strong.

The middle section S3 of the side walls 31, 32 gradually expands outward to form the first outer contact surface 2A and the second outer contact surface 2B. Thicknesses of the side walls 31, 32 at the first outer contact surface 2A and the second outer contact surface 2B are basically same as thicknesses of the\ side walls 31, 32 at other positions, which avoids increase of the thicknesses at the first outer contact surface 2A and the second outer contact surface 2B, such that the deformation is not difficult. That is, the thicknesses at the first outer contact surface 2A and the second outer contact surface 2B make the first outer contact surface 2A and the second outer contact surface 2B on the U-shaped inserting plate 30 more easily deformed during the gradual contact with the inserting grooves 101 and 201. The third connecting piece 30 is pre-formed into a U shape by sheet metal, and then the middle section S3 of the third connecting piece 30 is folded outward from the inner side of the side walls 31 and 32 by a pressing tool to form an outer expanded structure. The outer expanded structure acts as a dividing line to divide the third connecting piece 30 into two portions, and the two portions are configured to be inserted into the first inserting portion 101 and the second inserting portion 201 respectively.

Inner surfaces of the first connecting piece 10 and the second connecting piece 20 comprise a first guiding structure for inserting the third connecting member 30, for example, first guiding structure is an inwardly convex arc guiding surface extending along an inserting direction. An outer surface of the third connecting piece 30 comprises a second guiding structure that matches the first guiding structure. For example, the second guiding structure is an inwardly concave arc guiding surface extending along the inserting direction to prevent the third connecting piece 30 from moving along the direction perpendicular to the inserting direction after the third connecting piece 30 is inserted into the first connecting piece 10 and the second connecting piece 20, such that the third connecting piece 30 is limited to move relative to the first connecting piece 10 and the second connecting piece 20 in the inserting direction only.

Figure 5:
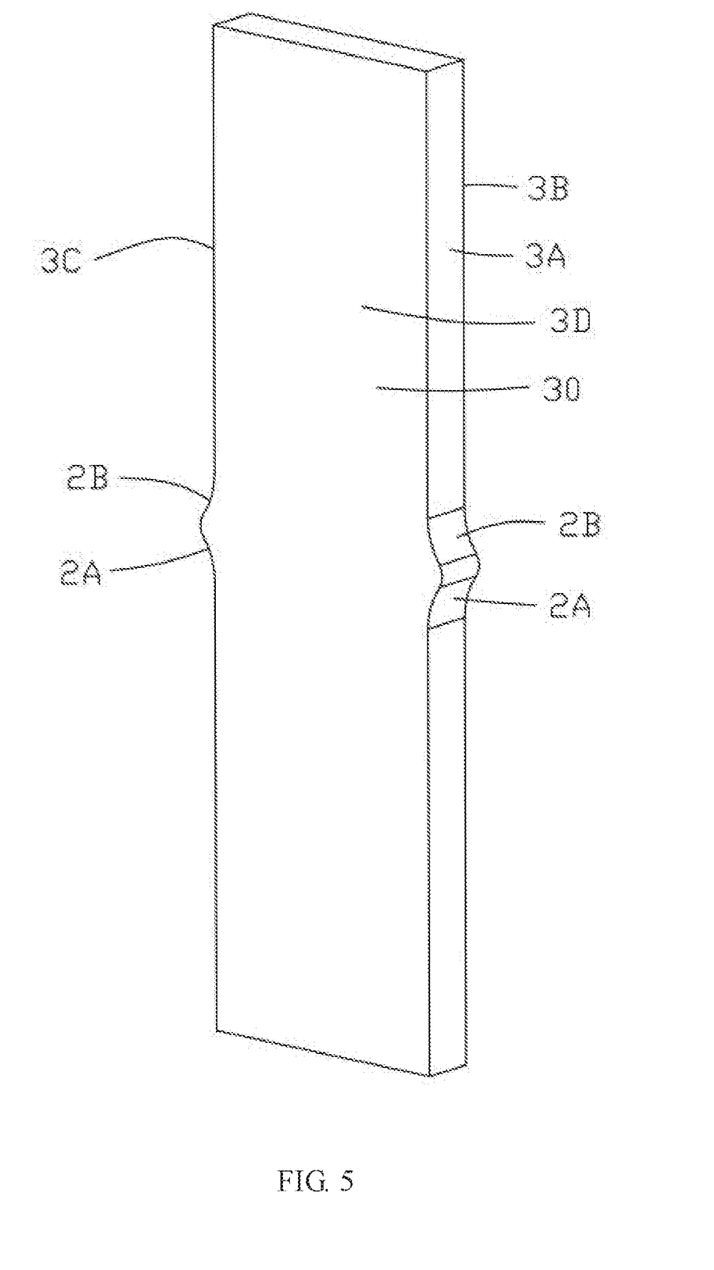
FIG. 5 is a schematic diagram showing a structure of the third connecting piece according to another embodiment of the present disclosure.

FIG. 5 shows a structure of a connecting assembly of the present disclosure according to one embodiment. In this embodiment, the third connecting piece 30 is a cuboid inserting plate, which comprises four outer side surfaces. The four side surfaces are respectively a first side surface 3A, a second side surface 3B, a third side surface 3C, and a fourth side surface 3D. The first side surface 3A is opposite to the third side surface 3C, and the second side surface 3B is opposite to the fourth side surface 3D. Both the first side surface 3A and the third side surface 3C comprise the first outer contact surface 2A and the second outer contact surface 2B, which are also capable of achieving a clamping effect. However, the cuboid inserting plate has a deformation performance that is slightly worse than the U-shaped inserting plate.

Figure 6:
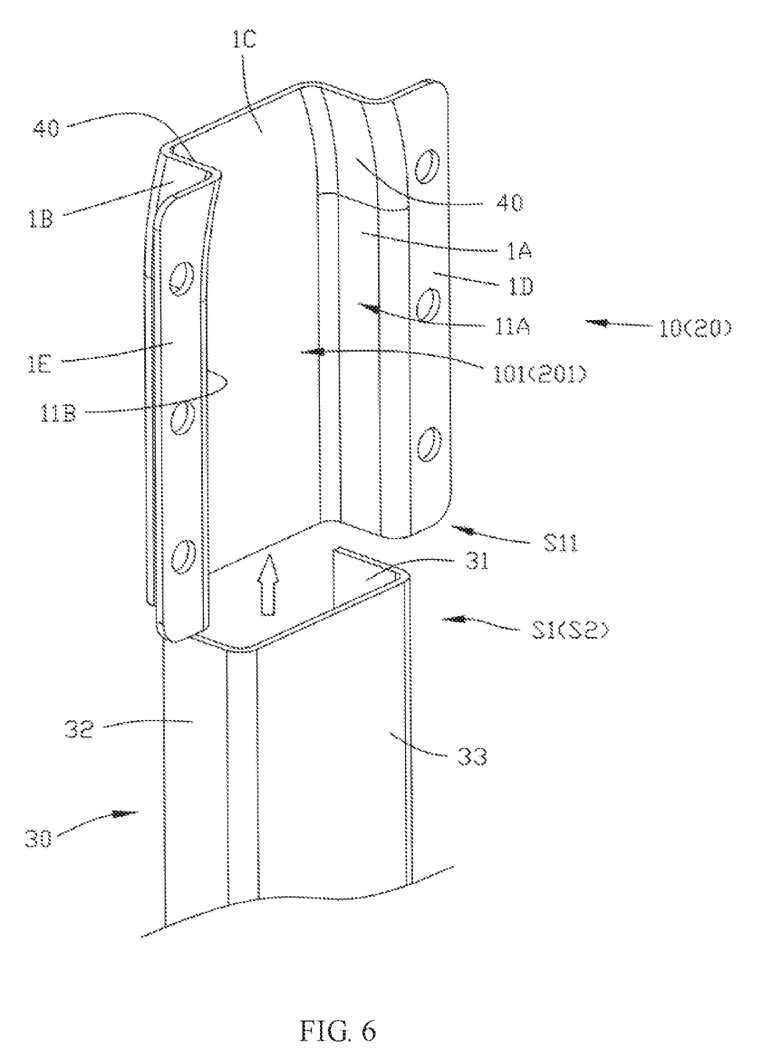
FIG. 6 is a schematic diagram showing a structure of the connecting assembly for the sofa according to another embodiment of the present disclosure.

FIG. 6 shows a structure of the third connecting piece according to another embodiment of the present disclosure. In this embodiment, the inserting grooves 101 and 201 comprise a respective inner contact surface 40 which is located at an end away from the inserting end S11. The third connecting piece is a U-shaped inserting plate or a cuboid inserting plate. The inner contact surface 40 gradually expands inward toward a direction away from the inserting end S11, and widths of the inserting grooves 101 and 201 gradually decrease. When the third connecting piece 30 is inserted into the inserting grooves 101 and 201 for a certain distance, the outer side surfaces 3A, 3C of the first end S1 and the second end S2 of the third connecting piece 30 contact the inner contact surface 40. A contact pressure between the outer side surfaces of the first end S1 and the second end S2. and the inner contact surface 40 gradually increase, until the contact pressure reaches a certain level, the third connecting plate 30 is unable to process with the operation of inserting into the first connecting piece 10 and the second connecting piece 20. Both ends of the third connecting piece 30 are clamped in the inserting grooves 101 and 201, so that the first connecting piece 10 and the second connecting piece 20 are fixed together by the third connecting piece 30.

In the embodiment, the inserting grooves 101 and 201 is still formed by U-shaped pieces. Each U-shaped piece comprises the first wall 1A, the second wall 1B, and the bottom wall 1C connecting the first wall 1A and the second wall 1B. The bottom wall 33 of the third connecting piece 30 is opposite to the bottom wall 1C. The first wall 1A is opposite to the second wall 1B. The first wall 1A comprise a first inner side surface 11A, and the second wall 1B comprises a second inner side surface 11B. The inner contact surface 40 is located on the first inner side surface 11A and the second inner side surface 11B. In one embodiment, the inner contact surface 40 may be located on only one of the first inner side surface 11A and the second inner side surface 11B.

When the third connecting piece 30 is inserted into the inserting grooves 101 and 201 for the certain distance, the inner contact surface 40 contacts the outer surfaces of the first side wall 31 and the second side wall 32 of the U-shaped inserting plate. The first side wall 31 and the second side wall 31 are squeezed to produce a certain amount of deformation inwardly, and the first side wall 31 and the second side wall 32 are deformed and firmly clamped in the inserting grooves 101 and 201.

Figure 7:
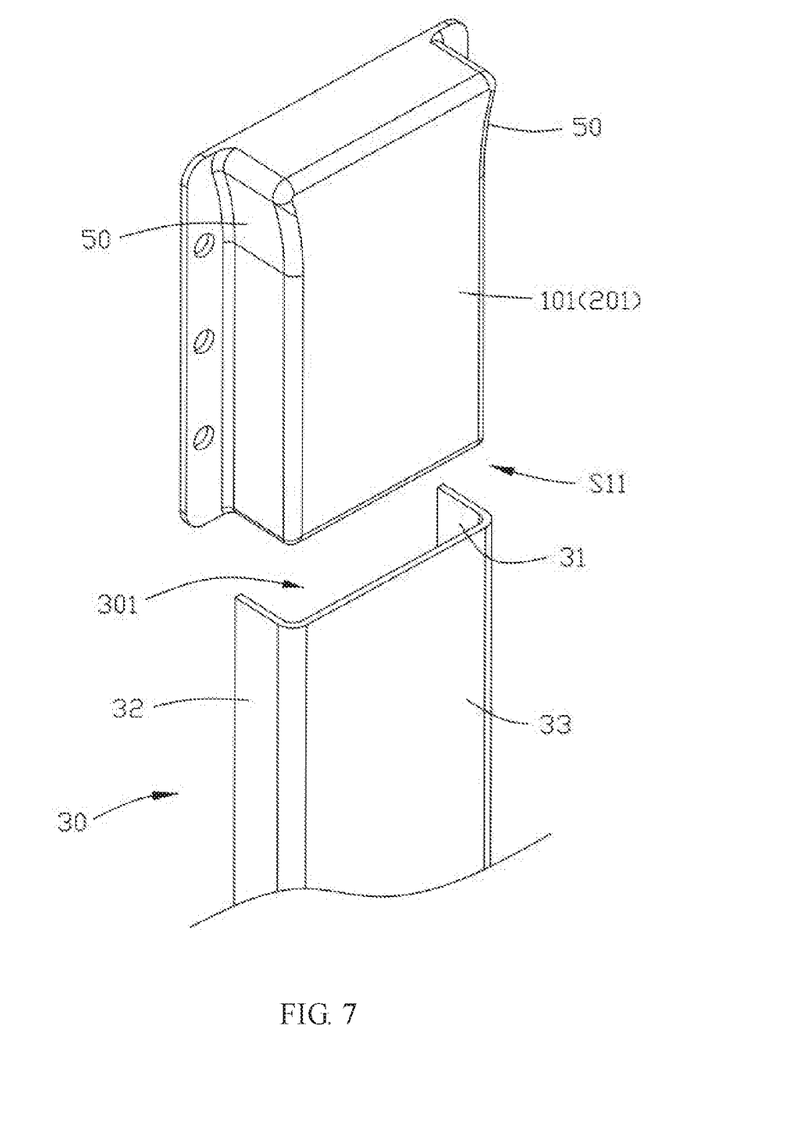
FIG. 7 is a schematic diagram showing a structure of the connecting assembly for the sofa according to another embodiment of the present disclosure.

FIG. 7 shows a structure of a connecting assembly according to another embodiment of the present disclosure. The function of the third connecting piece 30 is interchangeable with the first connecting piece 10 and the second connecting piece 20, That is, the third connecting piece 30 comprises an inserting grove 301, and the first inserting portion 101 of the first connecting piece 10 and the second insertion portion 201 of the second connecting piece 20 are inserted into inserting plates 102 and 202 om the inserting groove 301. The inserting ends S11 of the inserting plate 102 and 202 are inserted into the inserting groove 301. The inserting plates 102 and 202 comprise a respective contact surface 50, which gradually expands outward in a direction away from the inserting ends S11. During the inserting plates 102 and 202 inserting into the inserting groove 301 for a certain distance, a contact pressure between the contact surfaces 50 and the third connecting piece 30 gradually increase, and when the contact pressure reaches a certain level, the third connecting piece 30, the first connecting piece 10 and the second connecting piece 20 are clamped together into a whole.

In this embodiment, the third connecting piece 30 is a U-shaped piece. The U-shaped piece 30 forms the inserting groove 301. The U-shaped piece 30 comprises a first side wall 31, a second side wall 32, and a bottom wall 33 connecting the first side wall 31 and the second side wall 32. The first side wall 31 is arranged opposite to the second side wall 32, and the contact surface 50 is in contact with inner side surfaces of the side walls 31 and 32. During the insertion process, the first side wall 31 and the second side wall 32 of the U-shaped inserting plate 30 are squeezed to produce a certain amount of deformation inwardly, such that the connection between the third connecting piece 30, the first connecting piece 10, and the second connecting piece 20 is strong.

In the above embodiments, it can be understood that the third connector 30 can also be fixed to the second part 220 of the sofa in advance, and the first connector 10 is fixed to the first part 210 of the sofa in advance, so that the second part 210 is omitted. For the second connector 20, when assembling, the user only needs to insert the third connector 30 and the first connector 10 to connect the first component 210 and the second component 220 as a whole.

In the above embodiments, it can be understood that the third connecting piece 30 is also able to be fixed to the second component 220 of the sofa in advance, and the first connecting piece 10 is fixed to the first component 210 of the sofa in advance, so that the second connecting piece 20 is omitted. When assembling, the user only needs to insert the third connecting piece 30 and the first connecting piece 10 to connect the first component 210 with the second component 220 to be a whole.

The above descriptions are only optional embodiments of the present disclosure and are not intended to limit the present disclosure. Any modification, equivalent replacement and improvement made within the spirit and principle of the present disclosure shall be included in the protect scope of the present disclosure.

What is claimed is:

1. A connecting assembly for a sofa, comprising:
   a first connecting piece configured to fix on a first component of the sofa, and the first connecting piece comprises a first inserting portion;
   a second connecting piece configured to fix on a second component of the sofa, and the second connecting piece comprises a second inserting portion; and
   a third connecting piece;
   wherein a first end of the third connecting piece is configured to be inserted into and connected with the first inserting portion; a second end of the third connecting piece is configured to be inserted into and connected with the second inserting portion;
   wherein the third connecting piece is configured to be gradually inserted into the first inserting portion, a contact pressure between at least portions of the third connecting piece and the first inserting portion gradually increases to make the third connecting piece clamp to the first inserting portion; wherein the third connecting piece is configured to be gradually inserted into the second inserting portion, a contact pressure between at least portions of the third connecting piece and the second inserting portion gradually increases to make the third connecting piece clamp to the second inserting portion; the third connecting piece is connected with the first inserting portion and the second inserting portion such that the first component is connected with the second component.

2. The connecting assembly for the sofa according to claim 1, wherein the first inserting portion and the second inserting portion are inserting grooves, and the third connecting piece is an inserting plate configured to insert into the inserting grooves.

3. The connecting assembly for the sofa according to claim 2, wherein the inserting plate comprises a first outer contact surface close to the first end of the third connecting piece and a second outer contact surface close to the second end of the third connecting piece; the first outer contact surface gradually expands outward toward the second end of the third connecting piece; and the second outer contact surface gradually expands outward toward the first end of the third connecting piece.

4. The connecting assembly for the sofa according to claim 2, wherein the inserting plate is a U-shaped inserting plate.

5. The connecting assembly for the sofa according to claim 4, the U-shaped inserting plate comprises a first side wall, a second side wall, a bottom wall connecting the first side wall and the second side wall; the first side wall is arranged opposite to the second side wall; at least one of the first side wall and the second side wall comprises a first outer contact surface close to the first end of the third connecting piece and a second outer contact surface close to the second end of the third connecting piece; the first outer contact surface gradually expands outward toward the second end of the third connecting piece; and the second outer contact surface gradually expands outward toward the first end of the third connecting piece.

6. The connecting assembly for the sofa according to claim 5, wherein a middle section of the at least one of the first side wall and the second side wall gradually expands outward to form the first outer contact surface and the second outer contact surface.

7. The connecting assembly for the sofa according to claim 2, wherein the inserting grooves comprise an inserting end and an inner contact surface; the inner contact surface gradually expands inward along a direction away from the inserting end.

8. The connecting assembly for the sofa according to claim 7, the inserting grooves comprise a first inner side surface and a second inner side surface opposite to the first inner side surface; the inserting plate is a U-shaped inserting plate; the U-shaped inserting plate comprises a first side wall, a second side wall, and a bottom wall connecting the first side wall and the second side wall; the first side wall is arranged opposite to the second side wall; the first inner side surface corresponds to the first side wall; the second inner side surface corresponds to the second side wall; the inner contact surface is disposed on the first inner side surface and/or the second inner side surface.

9. The connecting assembly for the sofa according to claim 1, wherein the first inserting portion and the second inserting portion are inserting plates, and the third connecting piece comprises an inserting groove for inserting the inserting plates.

10. The connecting assembly for the sofa according to claim 9, wherein the inserting plates comprise an inserting end and a contact surface, and the contact surface gradually expands outward along a direction away from the inserting end.

11. The connecting assembly for the sofa according to claim 10, the third connecting piece is a U-shaped piece, the U-shaped piece forms the inserting groove; and the U-shaped piece comprises a first side wall, a second side wall, and a bottom wall connecting the first side wall and the second side wall; the first side wall is arranged opposite to the second side wall; and the contact surface is in contact with an inner side surface of the first side wall and the second side wall.

12. A connecting assembly for a sofa, comprising:
a first connecting piece configured to fix on a first component of the sofa, and the first connecting piece comprises a first inserting portion; and
a second connecting piece;
wherein a first end of the second connecting piece is configured to be inserted into and connected with the first inserting portion; a second end of the second connecting piece is configured to fix on a second component of the sofa;
wherein the second connecting piece is configured to be gradually inserted into the first inserting portion, a contact pressure between at least portions of the second connecting piece and the first inserting portion gradually increases to make the second connecting piece clamp to the first inserting portion, such that the first component is connected with the second component.

13. A sofa, comprising:
a first component,
a second component; and
a connecting assembly for the sofa;
wherein the connecting assembly for the sofa comprises:
a first connecting piece configured to fix on a first component of the sofa, and the first connecting piece comprises a first inserting portion;
a second connecting piece configured to fix on a second component of the sofa, and the second connecting piece comprises a second inserting portion; and
a third connecting piece;
wherein a first end of the third connecting piece is configured to be inserted into and connected with the first inserting portion; a second end of the third connecting piece is configured to be inserted into and connected with the second inserting portion;
wherein the third connecting piece is configured to be gradually inserted into the first inserting portion, a contact pressure between at least portions of the third connecting piece and the first inserting portion gradually increases to make the third connecting piece clamp to the first inserting portion; wherein the third connecting piece is configured to be gradually inserted into the second inserting portion, a contact pressure between at least portions of the third connecting piece and the second inserting portion gradually increases to make the third connecting piece clamp to the second inserting portion; the third connecting piece is connected with the first inserting portion and the second inserting portion such that the first component is connected with the second component.

14. The sofa according to claim 13, wherein the first component is a sofa seat, and the second component is a backrest or an armrest.

* * * * *